United States Patent [19]

Walon

[11] 4,281,028

[45] Jul. 28, 1981

[54] MALTULOSE-CONTAINING SYRUPS

[75] Inventor: Raoul Walon, Brussels, Belgium

[73] Assignee: CPC International Inc., Englewood Cliffs, N.J.

[21] Appl. No.: 118,891

[22] Filed: Feb. 6, 1980

Related U.S. Application Data

[62] Division of Ser. No. 5,524, Jan. 22, 1979, Pat. No. 4,217,413.

[30] Foreign Application Priority Data

Jan. 23, 1978 [GB] United Kingdom ................ 2653/78

[51] Int. Cl.[3] ................................................ A23L 1/09

[52] U.S. Cl. .................................... 426/658; 426/613; 127/29; 127/42

[58] Field of Search .................. 127/29; 426/613, 658; 435/95

[56] References Cited

U.S. PATENT DOCUMENTS

| | | | |
|---|---|---|---|
| 3,514,327 | 5/1970 | Parrish | 127/42 |
| 3,691,013 | 9/1972 | Sakai et al. | 435/95 |
| 3,910,821 | 10/1975 | Cory | 127/29 |
| 4,049,466 | 9/1977 | Walon | 127/29 |

FOREIGN PATENT DOCUMENTS 84655 10/1971 Japan .

*Primary Examiner*—Jeanette M. Hunter

[57] ABSTRACT

Sweet, non-crystallizing (at concentrations of 75% solids or above) syrups are prepared having the following saccharide composition: dextrose, from 20% to 40%; levulose, from 20% to 40%; maltulose, from 10% to 60%; total ketose composition (principally levulose and maltulose), 40% to 80% (percentages by weight dry basis). Optionally, the syrups may contain up to 25% maltose and/or up to 20% higher saccharides (i.e. having degrees of polymerization of greater than 2). The syrups are prepared by first subjecting a starch hydrolyzate, containing at least 40% maltose and not more than 5% dextrose, to an alkaline isomerization treatment to isomerize a portion of the maltose to maltulose, the isomerization being conducted until the resulting hydrolyzate contains between 10% and 60% maltulose. The resulting product is then treated with a glucoamylase to saccharify at least a portion of the remaining maltose (as well as higher saccharides, if present) to dextrose. That hydrolyzate is finally subjected to an isomerization reaction to isomerize up to 50% of the dextrose to levulose.

1 Claim, No Drawings

MALTULOSE-CONTAINING SYRUPS

This is a division of application Ser. No. 5,524 filed Jan. 22, 1979 now U.S. Pat. No. 4,217,413.

BACKGROUND OF THE INVENTION

1. Field of the Invention

This invention relates to new sweet, non-crystallizing syrups derived directly and solely from starch, containing maltulose, dextrose and levulose, plus, optionally, maltose and/or saccharides having degrees of polymerization (DP's) greater than 2, and to a process for making same.

2. The Prior Art

Maltulose (4-alpha-D-glucopyranosyl-D-fructose) is a ketose disaccharide which is present in honey; it can be synthesized by isomerizing maltose (the corresponding aldose) at an alkaline pH.

Until recently, there has been relatively little investigatory work conducted on the properties of maltulose. J. H. Pazur and K. Kleppe report that it is only slowly hydrolyzed by purified amylo-glucosidase. ("The Hydrolysis of Alpha-D-Glucosides by Amylo-Glucosidase from *Aspergillus niger*", *The Journal of Biological Chemistry,* Vol. 237, No. 4, Apr. 1962, pgs. 1002–1006.) The authors prepared pure maltulose by isomerizing maltose with alkali, hydrolyzing the unchanged maltose in the reaction mixture with amylo-glucosidase (gluco-amylase), chromatographing the resulting solution (consisting of glucose, maltulose and a small amount of fructose) on paper, and extracting the maltulose with water.

A paper entitled "Useful Properties of Maltose" by J. E. Hodge, J. A. Rendleman and E. C. Nelson, *Cereal Science Today,* Vol. 17, No. 7, July 1972, pgs. 180–188, presents a good discussion of the properties of maltose as well as other starch-derived sweeteners including maltulose. The authors prepared maltulose by chemical isomerization of maltose with sodium aluminate, and report 95% conversions by this method. The authors also report that, by "superficial testing" maltulose was judged sweeter than maltose but less sweet than sucrose or maltitol.

Sakai et al., in U.S. Pat. No. 3,691,013, rank the sweetness of a high maltulose product as about equal to maltitol, and below that of sucrose but above that of dextrose. The U.S. patent discloses the preparation of ketose sweetening agents having very high contents of maltulose (80% to 95%) plus small amounts of maltotriulose and other saccharides by subjecting a high-maltose hydrolyzate of starch to alkaline isomerization to convert a portion of the maltose to maltulose, converting the unreacted maltose to aldonic acid with a lactose dehydrogenase, and then removing the aldonic acids for formed. The patent also discloses the use of these very high maltulose products as sweetening agents in various food products.

U.S. Pat. No. 3,514,327 to Parrish discloses and claims a process for isomerizing glucose, maltose or lactose to the corresponding ketoses, i.e. levulose, maltulose and lactulose, respectively, by subjecting the aldose to the isomerizing action of certain specific amines.

Japanese published patent specification No. 49938/73 to Kikken Kagaku K. K. (published July 14, 1973, filed Oct. 27, 1971 as Japanese application No. 84655/71) shows isomerization of maltose in an aluminum-containing alkaline solution and very high conversions are reported. The three examples show the following products obtained by this isomerization technique: (1) 89.0% maltulose, 4.0% maltose, 1.5% levulose, 5.5% dextrose; (2) 74.1% maltulose, 0% maltose, 16.4% levulose, 9.5% dextrose; (3) 79.0% maltulose, 1.0% maltose, 12.7% levulose, 7.3% dextrose.

British Pat. No. 1,177,701 to Corn Products Company shows starch conversion syrups containing between 5% and 30% ketose (principally levulose), 35% to 45% dextrose and 15% to 35% maltose, prepared by treating a relatively high maltose starch hydrolyzate with glucoamylase to raise the dextrose content to at least 50% while retaining a substantial content of maltose, and then subjecting this hydrolyzate to an alkaline isomerization process to isomerize a portion of the dextrose to levulose. Although not specifically mentioned in the British patent, a small amount of maltulose is probably formed during the isomerization, in addition to the levulose.

In the area of maltulose the prior art workers have been principally concerned with obtaining pure maltulose (e.g. for experimental purposes) or end products having extremely high proportions of the sugar, i.e. 80% or higher, dry basis, in order to take maximum advantage of its sweetening power. My invention, on the other hand, comprises a new class of syrups, for use as sweeteners in food products, containing maltulose, dextrose and levulose, plus, optionally, maltose and/or higher saccharides (having degrees of polymerization greater than 2.)

SUMMARY OF THE INVENTION

The present invention comprises, as a new composition of matter a sweet syrup derived from starch, which syrup is non-crystallizing at a concentration of 75% solids, having a D.E. within the range of 60 to 90 and having the following saccharide composition, by weight dry basis:

- from 20% to 40% dextrose
- from 20% to 40% levulose
- from 10% to 60% maltulose
- from 0% to 25% maltose
- from 0% to 20% saccharides having a degree of polymerization greater than 2, the total ketose content, which is principally levulose plus maltulose, being within the range of 40% to 80%.

This invention further comprises a process for preparing the above-described syrups comprising the following steps:

a. first subjecting a maltose-containing starch hydrolyzate, containing at least 40% maltose and not more than 5% dextrose, to an alkaline isomerization treatment to isomerize a portion of the maltose to maltulose, said isomerization being conducted so as to provide from 10% to 60% maltulose, by weight dry basis, in the hydrolyzate, b. then subjecting the hydrolyzate to the action of glucoamylase under conditions which will cause the glucoamylase to saccharify the maltose and the saccharides of DP greater than 2 present in the hydrolyzate, without saccharifying the maltulose, the saccharification reaction being conducted until the hydrolyzate contains from 0% to 25% maltose plus at least 40% dextrose, and c. subjecting the resulting hydrolyzate to an isomerization reaction to isomerize up to 50% of the dextrose to levulose.

The syrups of the invention have excellent, sweet tastes, and are extremely useful as sweeteners in a large variety of food products. They do not crystallize (or "haze") at solids concentrations of 75% or higher; therefore, they can readily be stored and shipped in these high solids concentrations, which solids concentrations prevent bacteriological spoilage.

As the starting material for the preparation of the syrups any starch hydrolyzate which contains at least 40% maltose (preferably at least 60% maltose) and not more than about 5% dextrose is suitable. There is no upper limit to the maltose content of the starting material, pure (100%) maltose being a suitable, albeit expensive, starting material. This maltose-containing starch hydrolyzate is first subjected to an alkaline isomerization treatment so as to isomerize a portion, but not all, of the maltose, the alkaline isomerization being conducted so as to provide from 10% to 60% maltulose in the hydrolyzate. (Throughout the specification and claims, all percentages given are by weight, dry basis, unless otherwise indicated). Next, the maltulose-containing hydrolyzate is subjected to the action of glucoamylase under conditions which will cause the enzyme not to saccharify any of the maltulose present, but only to saccharify the maltose as well as any higher saccharides present to dextrose, the saccharification reaction being conducted until the hydrolyzate contains from 0% to 25% maltose plus a substantial amount of dextrose. Finally, the hydrolyzate is subjected to a suitable isomerization reaction (preferably with glucose isomerase although alkali may be employed) in order to isomerize up to 50% of the dextrose present to levulose.

DETAILED DESCRIPTION OF THE INVENTION

It is important that the starting material in the process of the present invention be a starch hydrolyzate containing at least 40% maltose, and a relatively small amount, preferably not above 5%, dextrose. Methods of preparing such stirring materials are well known in the art. They can, for example, be prepared by liquefying an aqueous suspension of starch to a relatively low D.E. by acid, or preferably by alpha-amylase, followed by saccharification with a maltogenic enzyme. Within recent years a number of techniques for preparing extremely high maltose (and low dextrose) starch hydrolyzates have been described, wherein the saccharification of the liquefied starch substrate is conducted with a combination of enzymes, specifically a maltogenic enzyme plus a starch-debranching enzyme such as pullulanase. U.S. Pat. Nos. 3,565,765 to Heady et al., 3,795,584 to Mitsuhashi et al., 3,904,715 to Sugimoto et al., and 3,677,896 to Kurimoto et al., all disclose suitable processes for preparing suitable high-maltose, low-dextrose starch hydrolyzates for practice of the invention. It is important that the starting material contain a relatively low amount, not more than about 5%, of dextrose, so as to minimize the formation of levulose during the first alkaline isomerization step, thereby permitting the maximum "control" over the saccharide composition of the final product.

The isomerization step, to isomerize a portion of the maltose to maltulose, can be performed in any known manner, such as the classical Lobry de Bruyn reaction, involving isomerization of an aldose sugar to its corresponding ketose at an alkaline pH (about 9 to 12.5) The pH can be raised by addition of strong alkali or by means of a strong basic ion exchange resin; this method is widely known, and is disclosed, among other places, in U.S. Pat. No. 3,691,013 of Sakai et al. Also, the method disclosed and claimed in U.S. Pat. No. 3,514,327 to Parrish would be suitable. These last-mentioned isomerization techniques result in conversion of less than 50% of the maltose present; therefore, if it is desired to prepare final products having higher maltose contents, i.e. up to the upper limit of 60% maltulose, the isomerization should be conducted with sodium aluminate or an aluminum-containing alkaline solution as taught by Hodge et al ("Useful Properties of Maltose", ibid) or Japanese published patent specification No. 49938/73. This initial alkaline isomerization step should be performed to provide at least 10%, and not greater than 60%, maltulose in the hydrolyzate; the upper limit of 60% is important for two reasons, (1) to insure that the final syrup will not crystallize, or haze, at high solids concentrations (75% or above) under normal conditions of storage and shipment, and (2) to leave an adequate amount of maltose in the hydrolyzate for further treatment in accordance with the invention.

The maltose-maltulose hydrolyzate from step 1 is next treated with glucoamylase under conditions which will not saccharify any of the maltulose formed in step 1. Maltulose is only slowly hydrolyzed by glucoamylase, and therefore these conditions are not different to achieve, suitable conditions for the glucoamylase treatment being 30 to 250 activity units (AU) per kilogram dry substance, (the most practical range being 50 to 150 AU), a pH of 4.0 to 6.0 (preferably about 4.5), and a temperature of 45° to 75° C. The glucoamylase treatment will, of course, act to hydrolyze the maltose, as well as any higher saccharides present in the hydrolyzate, to dextrose. The enzymatic treatment must be carried out until not more than 25% maltose remains in the hydrolyzate, and can be conducted until all or nearly all of the maltose has been hydrolyzed. If, on the other hand, some maltose is desired in the final product, then the glucoamylase treatment is terminated when the desired maltose level has been reached.

With respect to higher saccharides (DP3 and greater) present in the hydrolyzate from step 1, the glucoamylase treatment should be conducted so as to leave not more than 20% of these higher saccharides in the hydrolyzate.

Finally, the hydrolyzate from step 2, which will contain from 10% to 60% maltulose, from 0% to 25% maltose, from 0% to 20% higher saccharides, and at least about 40% dextrose, is subjected to an isomerization reaction to isomerize up to 50% of the dextrose present to levulsoe. Alkali may be used for this reaction, but glucose isomerase is greatly preferred, as it is a more efficient dextrose isomerizing agent and results in the production of fewer "by-product saccharides" than does alkali. The final product may then be refined in conventional manner (as by ion exchange and/or activated carbon) to yield clear, water-white products having very pleasant, sweet tastes, which will resist crystallization at solids concentrations of 75% or higher. The resultant syrups are extremely useful as sweetners in virtually all food products such as soft drinks, confectionneries, bakery goods, ice-cream, jellies and jams etc. They may be used as partial or complete replacement for other known sweetners in such food products.

The following examples will illustrate more fully the practice of the invention, which examples are presented for informative purposes only and should not be construed as limiting in any way the scope of the invention as claimed. Throughout the examples, whenever enzyme dosages are expressed in terms of activity units (AU), these are on the basis of 1 kilogram dry substance of substrate.

The activity of glucoamylase, expressed in activity units, is the number of grams of reducing sugars produced by 1 gram of enzyme in 1 hour at 60° C. and pH 4.3, during an incubation period of a total of 2 hours duration using, as the substrate, a starch hydrolyzate having a D.E. in the range of 10 to 20.

The activity of glucose isomerase, expressed in activity units, is the number of micro-moles produced by 1 g. of enzyme in 1 minute at 60° C. and pH 7.5 during an incubation conducted over a period of 30 minutes using a 10% D.S. dextrose solution.

EXAMPLE 1

A high maltose starch hydrolyzate was prepared as follows.

A 20 Baumé corn starch slurry was liquefied by first treating it with 0.02 (2,000 AU) bacterial alpha-amylase (Rapidase SP 250) at 85° C. and at pH 6.5 for 40 minutes after which the temperature was raised to 130° C. and held for three minutes. Then a second treatment with 0.015% (1,500 AU) alpha-amylase was conducted at pH 6.5, 85° C. After one hour, a D.E. of 12 was attained and there were no traces of unliquefied starch in the product. The pH was then adjusted to 5, the temperature lowered to 58° C. and the slurry was inoculated with 0.1% (80 AU) beta-amylase (Biozyme M from Amano Pharmaceutical Company, Japan); the inoculated slurry was incubated for 20 hours yielding a high-maltose hydrolyzate of the following composition.

| | |
|---|---|
| Baumé | 21.2° |
| D.E. | 64 |
| Dextrose | 2% |
| Maltose | 61% |
| DP3 | 12% |
| DP4 and higher | 25% |
| Ash | .32% d.s. |
| pH | 5.3 |

This high maltose hydrolyzate was then subjected to an alkaline isomerization step by treating it with a strong basic anion exchanger (MP600, Lewatit type from Bayer Co.), whereby the pH was raised to 9.7. The high maltose hydrolyzate was then heated at a temperature of 100° C. for 15 minutes. The pH of the solution lowered to 7.5 due to the reaction and formation of organic acids. The syrup then contained a quantity of maltulose and and had the following composition:

| | |
|---|---|
| D.E. | 46.3 |
| Dextrose | 3% |
| Levulose | 1% |
| Maltulose | 11% |
| Maltose | 49% |
| DP3 | 12% |
| DP4 and higher | 24% |
| Ash | .34% |

To this hydrolyzate was added 90 AU glucoamylase and the solution was incubated at pH 4.5 and 60° C. for 25 hours to produce a product of the following composition:

| | |
|---|---|
| D.E. | 89 |
| Dextrose | 80 |
| Levulose | 2% |
| Maltose | 1% |
| Maltulose | 12% |
| DP3 | 2% |
| DP4 and higher | 3% |

The composition was concentrated to 60% dry substance, the pH was adjusted to 6.5, magnesium salt was added and glucose-isomerase enzyme was added in an amount of 0.7% dry substance (10,000 AU). Nitrogen was bubbled through the system and the temperature was raised to 85° and held there for 35 hours. The product obtained after this incubation was refined by cation and anion exchangers and decolorized with activated carbon. The resultant product was evaporated under vaccum to 80% dry substance; it had the following composition:

| | |
|---|---|
| D.E. | 86.5 |
| Dextrose | 40% |
| Levulose | 40% |
| Maltose | 1% |
| Maltulose | 12% |
| DP3 | 3% |
| DP4 and higher | 4% |

This product is a clear water-white syrup having a high degree of sweetness comparable to sucrose. The syrup showed no tendencies to crystallize under normal storage conditions.

EXAMPLE II

A high maltose hydrolyzate was produced by first liquefying a 20 Baumé slurry of regular corn starch as in Example I, and then saccharifying as follows. To the liquefied starch was added 100 AU beta-amylase (Biozyme M from Amano Pharmaceutical Company, Japan) and 1600 AU pullulanase enzyme. After 20 hours of incubation at 58° C. and pH 5, the hydrolyzate had the following composition:

| | |
|---|---|
| D.E. | 52 |
| Dextrose | 3% |
| Maltose | 75% |
| DP3 | 9% |
| DP4 and higher | 13% |

This high maltose product was submitted to an ion exchanger treatment with a strong basic anion exchanger as in Example I to bring the pH to 9.6 during this operation. The product was heated for 3 hours at 65° C. after which the product had the following composition:

| | |
|---|---|
| D.E. | 53 |
| Dextrose | 3% |
| Levulose | 1% |
| Maltulose | 16% |
| Maltose | 59% |
| DP3 | 9% |
| DP4 and higher | 12% |

The hydrolyzate was then submitted to the action of 90 AU glucoamylase at pH 4.5 and 60° C. for 25 hours to produce the following composition:

| | |
|---|---|
| D.E. | 88 |
| Dextrose | 75% |
| Levulose | 1% |
| Maltulose | 17% |
| Maltose | 1% |
| DP3 | 2% |
| DP4 and higher | 4% |

This hydrolyzate was concentrated to 60% dry substance, the pH was adjusted to 6.5 and 10,000 AU glucose isomerase was added. The isomerization reaction was conducted as in Example I. The product was refined by cation and anion exchange, decolorized with activated carbon, and concentrated to 84% d.s. The product had the following composition:

| | |
|---|---|
| Dry substance | 84% |
| D.E. | 85.4 |
| Levulose | 37% |
| Dextrose | 39% |
| Maltulose | 17% |
| Maltose | 1% |
| DP3 | 3% |
| DP4 and higher | 3% |
| Ash | .6% |
| pH | 5.3 |

This product was a clear water-white syrup having a high degree of sweetness comparable to sucrose. The syrup was stable with no tendency to crystallize.

EXAMPLE III

This example, and the comparative example IIIA following it, will demonstrate the importance of the broad limits of the ingredients in the syrups of the invention, i.e. the upper limit of about 60% maltulose and the lower limits of about 20% each dextrose and levulose.

As starting material an extremely high maltose product was used, which product was obtained by subjecting a high maltose hydrolyzate to crystallization; the product had the following saccharide composition:

DP1±1%
Maltose 96%
DP>2±3%

A 35% d.s. aqueous solution of the product was made up, and to 1 l liter of the solution was added sufficient NaOH to bring the pH to 10–11. Then the solution was heated to 47° C. and 40 g. of pure sodium aluminate was added and dissolved with moderate stirring. The isomerization reaction was conducted for 5 hours at 45° C. with continuous stirring. Water was then added to bring the total volume to 4 liters and 10 N sulfuric acid was added to bring the pH to 3.8. Calcium carbonate was then added slowly until no more carbon dioxide was generated; the pH was then about 6.7.

The product was filtered to remove the aluminum hydroxide formed and washed with water to give 5 liters of filtrate. The filtrate was then concentrated to 1 liter (by heat and reduced pressure), ion-exchanged and decolorized. The product had the following composition:

DP1±1.5%
Maltose 39%
Maltulose 57%
DP>2±2.5%

The product was then treated with glucoamylase as in the previous examples until virtually all of the maltose had been saccharified to dextrose, to yield a hydrolyzate of the following composition:

| | |
|---|---|
| Dextrose | 40% |
| Levulose ± | 1% |
| Maltose | 1% |
| Maltulose | 57% |
| DP > 2 ± | 1% |

This was then treated with glucose isomerase, as before, to equilibrium conditions to produce a final product of the following composition:

| | |
|---|---|
| DE | 73.4 |
| Dextrose | 21% |
| Levulose | 20% |
| Maltose | 1% |
| Maltulose | 57% |
| DP > 2 ± | 1% |

The syrup had an extremely pleasant, sweet taste, and showed no tendency to crystallize at a concentration of 75% dry substance.

EXAMPLE IIIA—COMPARATIVE EXAMPLE

The 96% maltose product was subjected to alkaline isomerization as in Example III except the amount of sodium aluminate was increased to 60 g. The isomerized product contained 72% maltulose, 24% maltose, the balance being dextrose, levulose and saccharides of DP3 and higher.

This product was then treated with glucoamylase and then glucose isomerase as in the previous examples to form a final syrup of the following composition:

| | |
|---|---|
| D.E. | 67.6 |
| Dextrose ± | 13% |
| Levulose ± | 13% |
| Maltose ± | 1% |
| Maltulose | 72% |
| DP > 2 ± | 1% |

After a few days at room temperature a 75% solids solution spontaneously formed crystals of maltose. The syrup was noticeably less sweet than that of Example III.

EXAMPLE IV

In the previous examples the reaction with glucoamylase was conducted so as to eliminate virtually all of the maltose present by hydrolyzing it to dextrose. This example illustrates the preparation of a final syrup which contains a fair amount of maltose in addition to dextrose, levulose and maltulose.

The 96% maltose syrup of Example III was isomerized with sodium aluminate as in that example except only 8 g. sodium aluminate was added giving a product having the following composition (after 5 hours reaction time at 45° C.):

| | |
|---|---|
| DP1 ± | 1% |
| Maltulose | 21% |
| Maltose | 75% |
| DP > 2 ± | 3% |

The product was treated with 90 AU glucoamylase under conditions identical to those of Example I except the reaction was terminated after 8 hours by bringing the temperature of the hydrolyzate to boiling. The product had the following composition:

| | |
|---|---|
| DP1 (principally dextrose) | 57% |
| Maltulose | 21% |
| Maltose | 20% |
| DP > 2 | 2% |

It was then isomerized with glucose isomerase as in the previous examples to produce a final syrup of the following composition:

| | |
|---|---|
| D.E. | 79.0 |
| Dextrose | 29% |
| Levulose | 28% |
| Maltose | 20% |
| Maltulose | 21% |
| DP > 2 | 2% |

The syrup showed no tendency to crystallize at 85% solids concentration and had a very pleasant, sweet taste.

What is claimed is:

1. A sweet syrup composition derived from starch having a dextrose equivalent value within the range of 60 to 90 and having the following saccharide composition, by weight dry basis:

from 20% to 40% dextrose
from 20% to 40% levulose
from 10% to 60% maltulose
from 0% to 25% maltose
from 0% to 20% saccharides having a degree of polymerization of greater than 2, the total ketose content, which is principally levulose plus maltulose, being within the range of 40% to 80%, wherein said syrup is non-crystallizing at a concentration of 75% solids.

* * * * *

UNITED STATES PATENT AND TRADEMARK OFFICE

CERTIFICATE OF CORRECTION

PATENT NO. : 4,281,028

DATED : July 28, 1981

INVENTOR(S) : Raoul G. P. Walon

It is certified that error appears in the above-identified patent and that said Letters Patent are hereby corrected as shown below:

Title page, under [57] ABSTRACT, Line 16, after "with" delete "a".
Column 1, Line 54, "for" should read --so--.
Column 1, Line 65, "Kikken" should read --Nikken--.
Column 3, Line 66, after "12.5)" insert --.--.
Column 4, Line 26, "different" should read --difficult--.
Column 4, Line 51, "levulsoe" should read --levulose--.
Column 4, Line 62, "tionneries" should read --tioneries--.
Column 4, Line 64, "sweetners" should read --sweeteners--.
Column 5, Line 54, "46.3" should read --46.8--.

Signed and Sealed this

*Third* Day of *November 1981*

[SEAL]

*Attest:*

GERALD J. MOSSINGHOFF

*Attesting Officer* *Commissioner of Patents and Trademarks*